(12) United States Patent
Chuang et al.

(10) Patent No.: US 7,338,587 B2
(45) Date of Patent: Mar. 4, 2008

(54) ELECTROCHEMICAL PROCESS FOR OXIDATION OF ALKANES TO ALKENES

(75) Inventors: Karl T. Chuang, Edmonton (CA); Alan R. Sanger, Edmonton (CA); Jingli Luo, Edmonton (CA); Stefan V. Slavov, Edmonton (CA)

(73) Assignee: The Governors of the University of Alberta, Edmonton, Alberta (CA)

( * ) Notice: Subject to any disclaimer, the term of this patent is extended or adjusted under 35 U.S.C. 154(b) by 724 days.

(21) Appl. No.: 10/415,885

(22) PCT Filed: Nov. 9, 2001

(86) PCT No.: PCT/CA01/01603

§ 371 (c)(1),
(2), (4) Date: Oct. 10, 2003

(87) PCT Pub. No.: WO02/38832

PCT Pub. Date: May 16, 2002

(65) Prior Publication Data

US 2004/0050713 A1    Mar. 18, 2004

(30) Foreign Application Priority Data

Nov. 10, 2000    (CA) ................... 2325768

(51) Int. Cl.
*C25B 1/00*    (2006.01)
*C25B 3/00*    (2006.01)

(52) U.S. Cl. ............... 205/343; 205/413; 205/462
(58) Field of Classification Search ............. 205/343, 205/413, 462
See application file for complete search history.

(56) References Cited

U.S. PATENT DOCUMENTS

| 3,280,014 | A |   | 10/1966 | Kordesch et al. |
| 3,475,224 | A | * | 10/1969 | Adlhart et al. ............. 429/132 |
| 3,948,681 | A |   | 4/1976 | Barger, Jr. et al. |
| 4,911,803 | A |   | 3/1990 | Kunz |
| 4,933,054 | A | * | 6/1990 | Mazanec et al. ............. 205/338 |
| 6,030,718 | A |   | 2/2000 | Fuglevand et al. |
| 6,090,312 | A |   | 7/2000 | Ziaka et al. |
| 6,099,983 | A |   | 8/2000 | Nakagaki et al. |
| 6,248,460 | B1 |  | 6/2001 | Surampudi et al. |
| 6,294,068 | B1 |  | 9/2001 | Petrovic et al. |
| 6,468,684 | B1 | * | 10/2002 | Chisholm et al. ............ 429/33 |
| 6,841,512 | B1 | * | 1/2005 | Fetcenko et al. ............ 502/335 |

FOREIGN PATENT DOCUMENTS

WO    WO99/44253    2/1999

OTHER PUBLICATIONS

Kishimoto et al., "Amorphous Alloy Electrodes for Electro-Oxidation of Propane", Sci. Rep. RITU A41 (Mar. 1995), No. 1, pp. 83-88.*
Chemical Abstracts online; Kishmoto, Hirotatsu et al.; Amorphous Alloy Electrodes for Electrooxidation of Propane; XP002193071; Abstract; SCI.Rep. Res. Inst., Tohoku Univ., SER.A (1995), 41(1), 83-8, no month.
Michaels and Voyenas, Journal of Catalysis, vol. 85, pp. 477-487(1984), no month.

* cited by examiner

*Primary Examiner*—Edna Wong
(74) *Attorney, Agent, or Firm*—Philip Mendes da Costa Bereskin & Parr (57) ABSTRACT

An electrochemical process for the oxidation of an alkane to at least one corresponding alkene uses an electrochemical cell having an anode chamber on one side of a proton conducting medium, and a cathode chamber on the other side of the said medium. The alkane is oxidized in the anode chamber to produce at least one corresponding alkene and protons are transferred through a proton conducting membrane to the cathode chamber where protons combine with a proton acceptor, while generating electricity and water. An apparatus for use in the process is also provided.

17 Claims, 5 Drawing Sheets

ELECTROCHEMICAL PROCESS FOR OXIDATION OF ALKANES TO ALKENES

This is a national stage application filed under 35 USC 371 of PCT/CA01/01603 filed on Nov. 9, 2001.

FIELD OF THE INVENTION

This invention relates to an electrochemical process for oxidation of an alkane to the corresponding alkene using an electrochemical cell that has a proton-conducting medium. The process of the invention is for the selective production of alkenes while generating electricity and water.

BACKGROUND OF THE INVENTION

An alkane can be converted to the corresponding alkene by several processes, including partial oxidation and thermal cracking. According to these processes, for example, propane may be converted to propylene. Other alkanes can also be similarly converted to a corresponding alkene, for example: butane to one or more of 1-butene and 2-butene, and ethyl benzene to styrene.

Propane can be chemically oxidized to a mixture of products including propylene by reaction with a limited amount of oxygen. Catalysts are known for the activation of propane. When a mixture of propane and a limited amount of oxygen is passed over a catalyst a mixture of products is formed, including propylene, other hydrocarbon products, and oxides of carbon. It is very difficult to oxidize propane selectively to propylene. Typically, when propane is heated to a high temperature, typically several hundreds of degrees Celsius, the propane is cracked to form a mixture containing hydrogen, propylene, ethane, methane, ethylene, and higher hydrocarbons. The cracking process consumes energy. Further, the cracking process is not highly selective to propylene, and typically operates at low conversion. It is therefore necessary to separate the products of a catalytic oxidation reaction to obtain propylene in a commercially saleable or useable form (e.g., with other reaction products of the cracking process removed of reduced on a volume percent). Further, the heat generated by the oxidation reaction is recoverable only as process energy and not as high-grade energy such as electricity.

When a fuel is oxidized in a fuel cell, the products are the oxidation products from the fuel and electrical energy. Oxide ion conducting solid membranes are used in solid oxide fuel cells (a "SOFC"). In such cells, a source of oxygen is fed to a cathode catalyst where the oxygen combines with electrons to form oxide ions. The oxide ions pass through the solid membrane from the cathode to the anode. At a catalytic anode in a SOFC, oxide ions react with a fuel to generate oxidation products and electrons. When the fuel is propane, the oxidation products are usually oxides of carbon. Thus an oxide ion conducting SOFC can be designed to use propane as fuel. Mazanec et al. in U.S. Pat. No. 4,933,054 which issued in 1990, describe an electrochemical process using oxide ion conducting SOFC at temperatures in the range of about 500° C. to about 950° C. for electrochemical oxidative dehydrogenation of saturated hydrocarbons. The saturated hydrocarbons have from 2 to 6 carbon atoms, and include propane, and are converted to the corresponding unsaturated hydrocarbons, including propylene. Michaels and Vayenas, in Journal of Catalysis, Volume 85, 477-487 (1984), describe electrochemical oxidative dehydrogenation of ethyl benzene to styrene in the vapor phase using SOFC operated at high temperatures (e.g. above 650° Celcius).

Proton conducting solids are known, including polymer electrolyte membranes ("PEM"). PEM are used in $H_2$—$O_2$ fuel cells, an example of which is as described by Fuglevand et al. in U.S. Pat. No. 6,030,718. The hydrogen used as fuel in PEM fuel cells can be generated in several ways. Propane can be reformed to generate a hydrogen containing fuel for a fuel cell, and can be used as a coolant for a fuel cell. For example, Ziaka and Vasileiadis in U.S. Pat. No. 6,090,312, issued in 2000, disclose reforming reactions of light hydrocarbons having from 1 to 4 carbon atoms to generate hydrogen for use as fuel in a fuel cell. Nakagaki et al. in U.S. Pat. No. 6,099,983, issued in 2000, discloses reforming of propane to generate a hydrogen containing gas that is used as fuel in a fuel cell, in which the reformed hydrogen containing gas also serves as coolant for the fuel cell. Each of the above examples uses propane as a source of hydrogen to be used as fuel, and does not use propane as fuel.

SUMMARY OF THE INVENTION

One aspect of the present invention relates to operating an alkane fuel cell with a proton conducting medium that converts an alkane to at least one corresponding alkene at low temperatures and preferably low pressures.

Another aspect of the present invention relates to operating an alkane fuel cell with a proton conducting medium that converts an alkane to the corresponding alkene with a high degree of selectivity.

In accordance with one embodiment of this invention, there is provided an electrochemical process for oxidation of an alkane to a corresponding alkene using an electrochemical cell having an anode chamber having an anode and a cathode chamber having a cathode, the anode chamber and the cathode chamber separated at least in part by a proton conducting medium, said process comprising:

(a) providing at least one alkane to the anode chamber;
(b) providing an oxygen containing gas to the cathode chamber;
(c) passing protons through the said medium from the anode chamber to the cathode chamber whereby at least a portion of the alkane is converted to a corresponding alkene.

In one embodiment, the anode comprises at least one metal catalyst active for activation of the alkane and the anode and cathode are in electrical contact with each other and the process comprises producing electrons during the conversion of the alkane to the alkene and the catalytic cathode comprises at least one metal catalyst active for combination of oxygen with protons and electrons to form water.

In another embodiment, the process further comprises maintaining the electrochemical cell at a temperature and a pressure that maintains the moisture of said medium.

In another embodiment, the process further comprises providing the alkane in a gaseous state.

In another embodiment, the alkane is selected from the group consisting of propane, a mixture of propane and at least one inert gas, a mixture of propane and at least one inert liquid, and a mixture of hydrocarbons containing propane, and the process comprises producing propylene as the corresponding alkene.

In another embodiment, the alkane is selected from the group consisting of butane, a mixture of butane and at least one inert gas, a mixture of butane and at least one inert liquid, and a mixture of hydrocarbons containing butane, and the process comprises producing at least one of 1-butene and 2-butene as the corresponding alkene.

In another embodiment, the alkane is selected from the group consisting of a mixture of ethyl benzene and at least one inert gas, a mixture of ethyl benzene and at least one inert liquid, and a mixture of hydrocarbons containing ethyl benzene, and the process comprises producing styrene as the corresponding alkene.

In another embodiment, the oxygen containing gas is selected from a group consisting of oxygen, a mixture of oxygen and at least one inert gas, and air and the process further comprises combining protons which have passed through the medium and oxygen to produce water.

In another embodiment, the process is operated at a temperature of at least about 50° C.

In another embodiment, the, process is operated at a temperature in the range of about 50° C. to about 155° C.

In another embodiment, the process is operated at a temperature in the range of about 50° C. to about 100° C.

In another embodiment, the process is operated at a pressure of at least atmospheric pressure and below a pressure at which one or more of the alkane and the alkene will condense to form a liquid phase.

In another embodiment, the pressure is maintained sufficiently high so as to maintain moistness of the proton-conducting medium.

In another embodiment, the process is operated at a pressure of at least atmospheric pressure and below a pressure at which one or more of propane and propylene will condense to form a liquid phase, the pressure being sufficiently high so as to maintain the moistness of the proton conducting medium at the operating temperature.

In another embodiment, process is operated at a pressure of at least atmospheric pressure and below a pressure at which one or more of butane, and at least one of 1-butene and 2-butene will condense to form a liquid phase, the pressure being sufficiently high so as to maintain the moistness of the proton conducting medium at the operating temperature.

In another embodiment, the process is operated at a pressure of at least atmospheric pressure and below a pressure at which one or more of ethyl benzene, and styrene will condense to form a liquid phase, the pressure being sufficiently high so as to maintain the moistness of the proton conducting medium at the operating temperature.

In another embodiment, the process is operated at a pressure in the range of about 0.5 atm to about 10 atm.

In another embodiment, the process is operated at about atmospheric pressure.

In accordance with another aspect of the instant invention, there is provided an electrochemical apparatus for oxidation of an alkane to a corresponding alkene comprising:
  (a) an anode chamber having an anode, the anode comprising a metal catalyst active for activation of the alkane;
  (b) a cathode chamber having a cathode, the cathode comprising a metal catalyst active for combination of a proton acceptor with protons; and,
  (c) a proton conducting medium positioned in fluid flow communication with both the anode chamber and the cathode chamber.

In one embodiment, the proton acceptor comprises oxygen.

In another embodiment, the proton acceptor is a gas selected from a group consisting of oxygen, a mixture of oxygen and at least one inert gas, and oxygen is combined with protons that have passed through the medium and oxygen to produce water.

In another embodiment, the alkane is gaseous.

In another embodiment, the alkane is a linear molecule or a linear substituent of a cyclic or aromatic molecule.

In another embodiment, the alkane has a carbon chain length of from 2 to 6 carbon atoms.

In another embodiment, the proton conducting medium is a solid perfluorosulphonic acid proton conducting membrane.

In another embodiment, the catalytic anode and the catalytic cathode separately are formed of compressed carbon powder loaded with metal catalyst, the metal catalyst of the catalytic anode being selected from metal catalysts active for activation of an alkane, and the metal catalyst of the catalytic cathode being selected from metal catalysts active for combination of oxygen with protons and electrons to form water.

In another embodiment, the alkane comprises propane and the catalytic anode and the catalytic cathode separately are formed of carbon cloth loaded with metal catalyst, the metal catalyst of the catalytic anode being selected from metal catalysts active for activation of propane, and the metal catalyst of the catalytic cathode being selected from metal catalysts active for combination of oxygen with protons and electrons to form water.

In another embodiment, the alkane comprises butane and the catalytic anode and the catalytic cathode separately are formed of nickel mesh impregnated with metal catalyst, the metal catalyst of the catalytic anode being selected from metal catalysts active for activation of propane, and the metal catalyst of the catalytic cathode being selected from metal catalysts active for combination of oxygen with protons and electrons to form water.

In another embodiment, the metal catalyst active for activation of alkane is selected from the group consisting of platinum, palladium, silver, nickel, cobalt, gold, bismuth, manganese, vanadium, ruthenium, copper, zinc, chromium, iron or indium oxide-stannous oxide mixtures, or any mixtures thereof.

In another embodiment, the metal catalyst active for activation of the alkane is selected from the group consisting of nickel, cobalt or a mixture of nickel and cobalt.

In another embodiment, the metal catalyst for activation of alkane is selected from the group consisting of platinum, palladium or a mixture of platinum and palladium.

In another embodiment, the metal catalyst active for combination of oxygen with protons and electrons to form water is selected from the group consisting of nickel, cobalt, gold, bismuth, manganese, vanadium, ruthenium, copper, zinc, chromium, iron or indium oxide-stannous oxide mixtures, or any mixtures thereof.

In another embodiment, the metal catalyst active for combination of oxygen with protons and electrons to form water is selected from the group consisting of nickel, cobalt or a mixture of nickel and cobalt.

In another embodiment, the metal catalyst active for combination of oxygen with protons and electrons to form water is selected from the group consisting of platinum, palladium or a mixture of platinum and palladium.

In another embodiment, the apparatus is operated at a temperature of at least about 50° C.

In another embodiment, the apparatus is operated at a temperature in the range of about 50° C. to about 155° C.

In another embodiment, the apparatus is operated at a temperature in the range of about 50° C. to about 100° C.

In another embodiment, the process is operated at a pressure of at least atmospheric pressure and below a pressure at which one or more of the alkane and the alkene will condense to form a liquid phase.

In another embodiment, the pressure is maintained sufficiently high so as to maintain moistness of the proton-conducting medium.

Accordingly, one advantage according to one aspect of the instant invention is that the conversion of alkanes to alkenes may be conducted at temperatures below 200° C.

Another advantage of the invention is that according to one aspect, the process may be used to operate a propane fuel cell that converts propane with a high degree of selectivity to propylene.

Another advantage of the invention is that according to one aspect, the process may be used to oxidize propane selectively to propylene at a temperature lower than a temperature of operation of a SOFC and even at a temperature below thee boiling point of water, and thereby recover water as liquid.

BRIEF DESCRIPTION OF THE DRAWINGS

These and the other features of the invention will become more apparent from the following description in which reference is made to the appended drawings, wherein.

DETAILED DESCRIPTION OF THE INVENTION

The electrochemical cell and process for electrochemical oxidation of an alkane to one or more corresponding alkenes will now be described with reference to FIGS. 1 through 5. The process of this invention is applicable to any alkane. The alkane may be a linear alkane (e.g. propane and butane) or a cyclic or aromatic alkane (e.g. cyclohexane, ethyl benzene). The linear alkane may have a straight chain or may be branched. Preferably, the alkane is a linear alkane or a substituted cyclic or a substituted aromatic alkane (e.g. tetrahydronaphthalene). In the case of a substituted cyclic or a substituted aromatic alkane, the reaction is preferably targeted at converting the substituent carbon chain and not the cyclic or aromatic portion of the molecule. For example, the organic feedstock may be 2-methyl alkane so that, e.g., 2-methylhexane could be converted to 2-methyl-1-hexene plus the 2-methyl-2-hexene isomer. More preferably, the alkane is a linear alkane. Most preferably, the alkane is a linear, non-branched alkane. The alkane may have a chain length of from 2 to 12 carbon atoms and preferably from 2 to 6 carbon atoms.

The alkane may be in any form that can flow so as to flow through the electrochemical cell. The alkane may be a liquid or a gas. If the alkane is a light hydrocarbon, then the organic feedstock is preferably in the form of a gas since otherwise an elevated pressure would be required to cause the hydrocarbon to be in its liquid form. Similarly, if the organic feedstock is a mid-range hydrocarbon (e.g. decane) the hydrocarbon is preferably in the form of a liquid since otherwise a relatively high temperature would be required to use the hydrocarbon in its gaseous state.

According to this process, one or more bonds in the alkane is converted to an alkene. Thus this process may be used to convert propane to propylene or to convert butane to 1-butene and/or 2-butene. Preferably, the alkene generated by the process of the present invention is reagent grade alkene. The reaction has a high degree of selectivity. By this it is meant that a high percentage, and preferably substantially all, of the alkane that is consumed by the process is converted to the corresponding alkene (or if there is more than one corresponding alkene, then to one or more of the corresponding alkenes) and that only a minor portion, and preferably essentially none, of the corresponding alkyne is produced. Unlike catalytic cracking, the carbon chain length of the alkane in the feedstock is essentially not altered.

For purpose of illustration only, the process of the present invention will be described for the electrochemical conversion of propane to propylene. Application of the process for the conversion of alkane anode feeds, including propane, butane and ethyl benzene separately, will then be illustrated by a series of non-limiting examples.

The process of this invention may be conducted in any electrochemical cell that has at least one anode and at least one cathode that are each in ionic contact with a proton-conducting medium. In one embodiment, the electrochemical cell used in the invention has one anode, one cathode and a proton-conducting medium.

Figure 1:
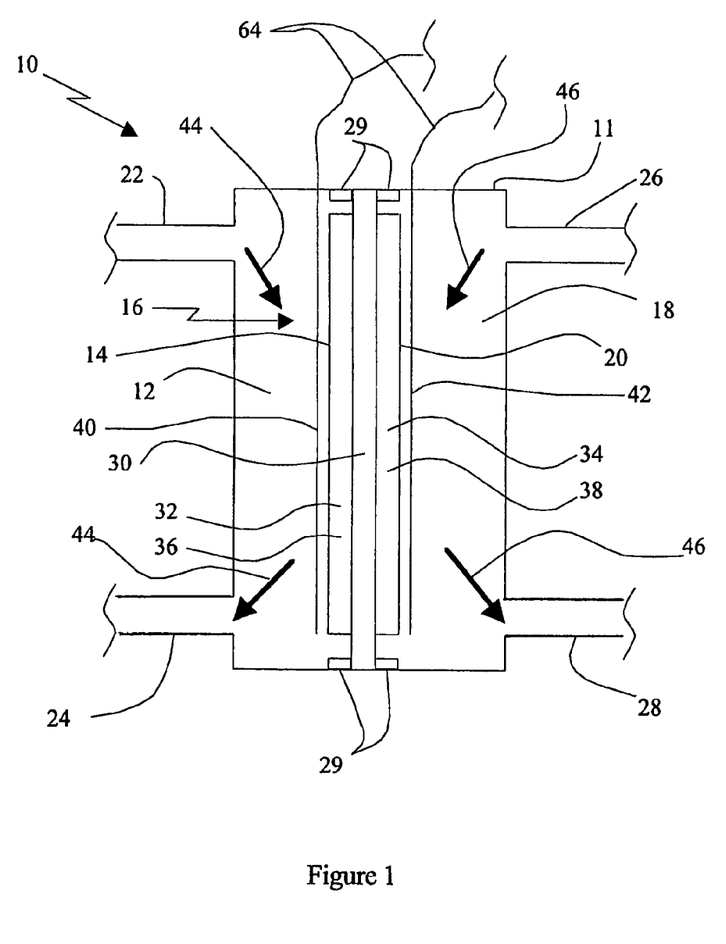
FIG. 1 is a schematic diagram of a cell for the electrochemical oxidation of an alkane to the corresponding alkene.

In the embodiment of FIG. 1 electrochemical cell 10 has a body 11 enclosing an anode chamber 12 on one side 14 of a proton conducting medium 16, and a cathode chamber 18 on another side 20 of said medium 16. Anode chamber 12 has a first inlet 22 and a first outlet 24. Cathode chamber 18 has a second inlet 26 and a second outlet 28. Body 11 and the proton conducting medium 16 are electrically insulated from each other by insulators 29. A first current collector 40 is in electrical contact with catalytic anode 32. A second current collector 42 is in electrical contact with catalytic cathode 34. It will be appreciated that cell 10 may be of a variety of configurations provided that protons are produced at least one anode chamber and transmitted to at least one cathode chamber through a proton conducting medium.

In one embodiment, catalytic anode 32, catalytic cathode 34 and solid proton conducting membrane 30, which functions as the proton-conducting medium, are assembled as a membrane electrode assembly (MEA). However it will be appreciated that each of these elements may be separately assembled into a cell and need not be positioned adjacent each other as shown in FIG. 1.

The proton-conducting medium can be made from any material that can transfer protons from catalytic anode 32 to catalytic cathode 34. Commercially available proton conducting materials suitable for membrane 30 include perfluorosulphonic acid polymer available under the trademark NAFION™ (Du Pont de Nemours and Company), Gore Select™ (W. L. Gore and Associates) and ion-exchange amide systems. Membrane materials that may be used as the proton conducting medium 16 include membranes of modified perfuorinated sulphonic acid polymer, polyhydrocarbon sulphonic acid and composites of two or more kinds of proton exchange membranes can be used. Membranes of polyethylene and polypropylene sulphonic acid, polystyrene sulphonic acid and other polyhydrocarbon-based sulphonic acids (such as membranes made by RAI Corporation, USA) may also be used depending on the temperature and duration of fuel cell operation. Composite membranes consisting of two or more types of proton-conducting cation-exchange polymers with differing acid equivalent weights, or varied chemical composition (such as modified acid group or polymer backbone), or varying water contents, or differing types and extent of cross-linking (such as cross linked by multivalent cations e.g., $Al^{3+}$, $Mg^{2+}$ and the like) may be used.

Catalytic anode 32 comprises or consists essentially of a first metal catalyst 36. First metal catalyst 36 is selected from metal catalysts active for activation of an alkane, for example propane. Activation of an alkane is defined as catalyzing the oxidative dehydrogenation of alkanes to the corresponding alkenes. Examples of metals and metal oxides useful in activating an alkane include platinum, palladium, silver, nickel, cobalt, gold, bismuth, manganese, vanadium, ruthenium, copper, zinc, chromium, iron or indium oxide-stannous oxide mixtures, or any mixtures of said metals and metal oxides. In a preferred embodiment, the first metal catalyst 36 of the catalytic anode 32 is selected from nickel, cobalt, platinum, palladium, a mixture of platinum and palladium, or mixtures thereof. In a more preferred embodiment, the first metal catalyst 36 of the catalytic anode 32 is selected from platinum, palladium or a mixture of platinum and palladium. Generally, the selection of the first metal catalyst may be based on the activity of the metal for thermo-catalytic processes with the selected alkane.

Catalytic cathode 34 may comprise or consist essentially of second metal catalyst 38. Second metal catalyst 38 is selected from metal catalysts active for combining oxygen with protons and electrons to form water. Examples of metals and metal oxides useful in combining oxygen with protons and electrons to form water include platinum, palladium, silver, nickel, cobalt, gold, bismuth, manganese, vanadium, ruthenium, copper, zinc, chromium, iron or indium oxide-stannous oxide mixtures, or any mixtures of said metals and metal oxides. In a preferred embodiment, the second metal catalyst 38 of the catalytic cathode 34 is selected from nickel, cobalt, platinum, palladium, a mixture of platinum and palladium, a mixture of nickel and cobalt or mixtures thereof. In a more preferred embodiment, the second metal catalyst 38 of the catalytic cathode 34 is selected from platinum, palladium or a mixture of platinum and palladium.

Anode 32 may be constructed from first metal catalyst 36. Alternately, anode 32 may comprise a support loaded with a first metal catalyst 36. Thus, the catalytic metal may be plated on or other wise associated with a support. The support may be inert to the reaction (i.e. it does not electrochemically affect the reaction in anode chamber 12 or at least does not deleteriously affect the reaction). Alternatively, the support may be a first catalytic metal. Similarly, cathode 34 may be constructed from second metal catalyst 38 or may comprise a support loaded with a second metal catalyst 38. For example, the support of catalytic anode 32 or catalytic cathode 34 may be formed from compressed carbon powder onto which has been deposited (loaded) metal catalyst 36 or 38 respectively, carbon cloths supporting metal catalyst 36 and 38 respectively or nickel mesh impregnated with metal catalyst 36 and 38 respectively. The catalytic anode 32 and catalytic cathode 34 can be assembled according to established methods, for example, by the methods described in U.S. Pat. No. 6,294,068 granted to Petrovic et al. on Sep. 25, 2001.

In the process of the present invention, the alkane is provided to anode chamber by any method known in the art and may be removed therefrom by any method known in the art. Preferably, the alkane is gaseous since the viscosity of the liquid to flow through anode chamber 12 is less than if the hydrocarbon feed was in the liquid state. For example, in the embodiment of FIG. 1, an anode stream containing propane is fed through first inlet 22 into anode chamber 12 and exits anode chamber 12 through first outlet 24, as indicated by arrows 44. Anode chamber 12 may include one or more inlets 22 and one or more outlets 24.

The alkane may be fed alone through one or more first inlets 22 into anode chamber 12, or as a mixture containing an alkane diluted with one or more inert gases such as nitrogen, helium, neon, argon, krypton, xenon or any other gas, including steam that does not deleteriously interfere with the oxidative dehydrogenation of the alkane. The alkane can also be mixed with other hydrocarbon gases, including a mixture with methane. It will be appreciated that the hydrocarbon feedstock fed to treated in anode chamber 12 may comprise a mixture of alkanes so as to obtain a mixture of the corresponding alkenes. In such a case, each different alkane may not be converted to the same degree. The alkane or alkanes may also be fed through first inlet 22 into anode chamber 12 by themselves, or with an inert carrier liquid (e.g. nitrogen or argon) or with a pure (compressed) liquid (e.g. hexane) that can be used at the temperatures at which electrochemical cell 10 operates.

A cathode stream which does not deleteriously interfere with the reaction in cathode chamber 18 is fed through one or more second inlets 26 into cathode chamber 18 and exits cathode chamber 18 through one or more second outlets 28 (not shown), as indicated by arrows 46. In one embodiment, the cathode stream may consist of or include any proton acceptor (a medium that will accept the protons which are transferred to cathode chamber 12). The medium may be liquid or a gas and is preferably a gas. The gas may be a halogen such as chlorine that when combined with protons would form HCl. Preferably, the cathode stream consists of or includes oxygen. The stream may contain oxygen alone, air or a mixture of oxygen and at least one inert gas. The inert gas may be selected from nitrogen, helium, neon, argon, krypton, xenon or any other gas that does not interfere with the reduction of oxygen to water. It will be recognized that the direction of arrows 44 and the direction of arrows 46 is shown for the purposes of illustration only, and are not to be construed as indicating that the anode stream and the cathode stream must necessarily flow in the same direction across respectively first side 14 and second side 20 of medium 16. For example, the flow may be counter current or concurrently through chambers 12, 18.

The process of the present invention comprises an anode reaction and a cathode reaction. Referring to FIG. 1, in anode chamber 12, an alkane is activated to form the corresponding alkene; protons, and electrons. Protons pass through proton conducting medium 16 from anode chamber 12 to cathode chamber 18. Electrons are collected at catalytic anode 32 by first current collector 40 and are conveyed to catalytic cathode 34 by second current collector 42. First current collector 40 and second current collector 42 may be directly connected to each other or may be connected via an external electrical load (not illustrated) by electrical leads 64. If employed, the load (which may be a fixed or variable resistance controller) is used to control the electrical flow to cathode chamber 18. The leads are insulated to prevent electrical contact with body 11. Electrons combine with protons and oxygen at active sites of the second metal catalyst 38 of the catalytic cathode 34 to form water. The overall process is the oxidation of an alkane to the corresponding alkene, and the formation of water from oxygen, protons and electrons.

Figure 2:
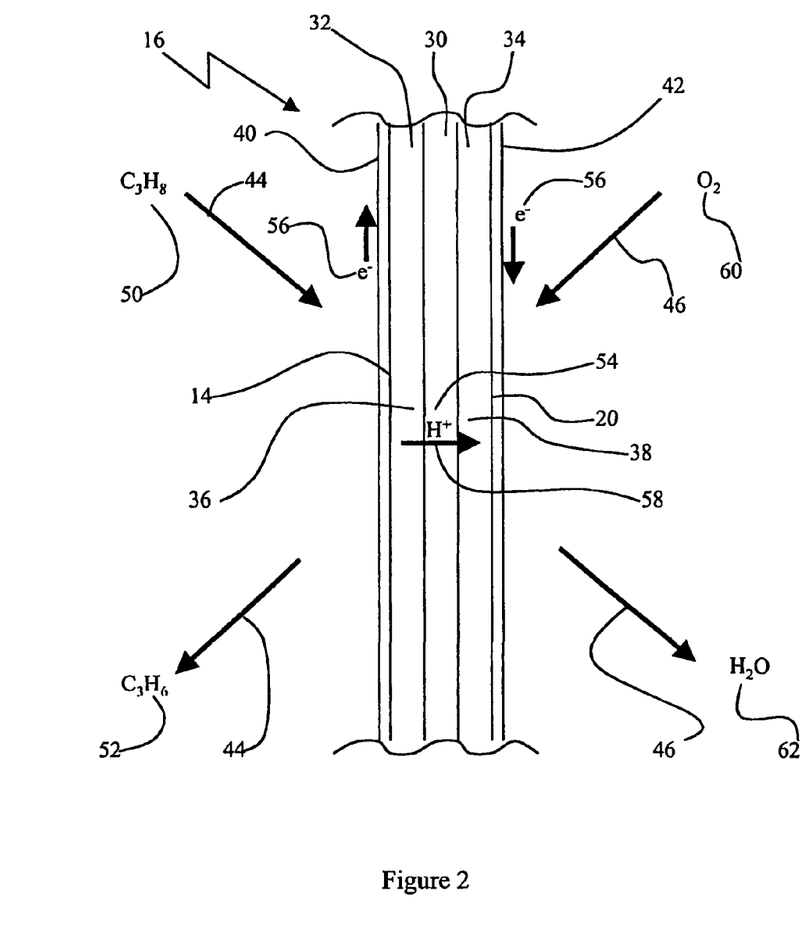
FIG. 2 is a diagram showing the electrochemical reactions comprising the electrochemical oxidation of propane to propylene and the electrochemical reduction of oxygen to water in the fuel cell of FIG. 1.

In one embodiment, with reference to FIG. 2, propane 50 ($C_3H_8$) is activated at active sites of first metal catalyst 36 of catalytic anode 32 to form propylene 52 ($C_3H_6$), protons 54 ($H^+$), and electrons 56 ($e^-$) according to Equation 1. Protons 54 pass through proton conducting membrane 30 from catalytic anode 32 to catalytic cathode 34 as indicated by arrow 58. Protons 54 combine with electrons 56 and oxygen 60 ($O_2$) at active sites of second metal catalyst 38 of catalytic cathode 34 to form water 62 ($H_2O$) according to Equation 2. The overall process is oxidation of propane 50 to propylene 52 and the formation of water 62 from oxygen 60, protons 54 and electrons 56, according to Equation 3. Electrons 56 are collected at catalytic anode 32 by first current collector 40 and are conveyed to catalytic cathode 34 by second current collector 42. First current collector 40 and second current collector 42 are connected to an external electrical load (not illustrated) by electrical leads 64, as shown in FIG. 1, the leads being insulated to prevent electrical contact with body 11.

$$C_3H_8 \rightarrow C_3H_6 + 2H^+ + 2e^- \quad [1]$$

$$O_2 + 4H^+ + 4e^- \rightarrow 2H_2O \quad [2]$$

$$2C_3H_8 + O_2 \rightarrow 2C_3H_6 + 2H_2O \quad [3]$$

The process of the present invention may be conducted at a temperature below about 200° C. The lower range of the temperature is premised upon the reaction kinetics. As the temperature is reduced, the reaction rate decreases. Preferably, the process is conducted at a temperature from about 20° C. to about 155° C., preferably from about 50° C. to about 155° C. and most preferably from about 50° C. to about 100° C. If the temperature is below about 50° C., then the reaction proceeds relatively slowly. The process may be conducted below this temperature if the rate of reaction is acceptable. If the process is conducted at a temperature below about 100° C. (i.e. below the boiling point of water at atmospheric pressure), then the resultant water will be liquid. If the process is conducted above atmospheric pressure, then, liquid water may be produced at an even higher temperature. The process may be operated at higher temperatures provided that cell 10 maintains it structural integrity at those temperatures. The process of the present invention may also be operated wherein the temperature in the anode chamber 12 can be different than the temperature in the cathode chamber 18. Preferably the temperature in anode chamber 12 is substantially the same as the temperature in cathode chamber 18. The use of a lower operating temperature permits better control of the feedstock and the product and a reduced level of side reactions. A lower temperature may increase the longevity of some membranes.

For example, in one embodiment, when cell 10 uses NAFION™ as proton conducting membrane 30, the oxidation of propane to propylene may be conducted at a temperature in the range of about 65° C. to about 95° C. When the temperature is below 65° C. the rate of the reaction is slow. When the temperature of the reaction is above 95° C. it is necessary to operate cell 10 at a pressure greater than atmospheric pressure to ensure that NAFION™ membrane 30 does not lose structural water, and thereby remains moist and maintains proton-conducting capability.

Optionally, means may be provided for humidifying one or both of chambers 12, 18, such as by humidifying anode chamber stream 44 before first inlet 22 and/or cathode chamber stream 46 before second, inlet 26 to provide sufficient water to prevent membrane 16 from drying out at higher operating temperatures. However, membranes that can conduct protons without having to remain moist, may also serve as the proton conducting medium 16 in the present invention and reduce or eliminate the need to humidify any of the streams.

The process of the present invention may be conducted at a pressure from about 0.1 atmospheres (atm) to about 100 atm, preferably from about 0.5 atm to about 10 atm and more preferably from about 1 atm to about 5 atm. Further, preferably the pressure is at least atmospheric pressure, thereby providing for a high concentration of alkane at catalytic anode 32 and a high concentration of oxygen at catalytic cathode 34.

The process of the present invention is preferably operated at a pressure below a pressure at which the alkane to be oxidized, the corresponding alkene or a combination of the alkane and the alkene would condense to form a liquid phase at the temperature of the reaction. Accordingly, the shorter the carbon chain, the higher the preferred pressure may be.

The pressure in the anode chamber 12 can be different than the pressure in the cathode chamber 18. Preferably the pressure in anode chamber 12 is substantially the same as the pressure in cathode chamber 18, thereby reducing or essentially reducing stress on proton conducting medium 16 and crossover. Crossover is a process where the alkane feed permeates through proton conducting medium 16 and combines with oxygen on the catalytic surface of the cathode. Crossover lowers the efficiency of cell 10, reduces performance and generates heat in the fuel cell. Factors which lower the occurrence of crossover include a lower flow rate of the alkane, a lower concentration of the alkane, operation of the electrochemical cell at a lower temperature, and minimizing the access of the alkane to the proton conducting medium, such as by the design of the anode with hydrophobic and hydrophilic regions. It is appreciated by those skilled in the art that an amount of crossover may occur without deleteriously affecting the commercial usability of the electrochemical cell in the present invention. Unbalanced pressures can lead to rupture of the membrane and possible crossover. However, it will be appreciated that stress on the proton conducting medium 16 during the operation of the cell as a result of a difference in pressure between the anode chamber and the cathode chamber can be reduced or essentially reduced by structurally reinforcing the proton conducting medium 16.

As the pressure is increased, the concentration of alkane at the catalyst sites is increased and the flux is increased. Further, at increased pressures, the propensity for water to evaporate is reduced, and hence this may improve membrane life and activity.

Figure 3:
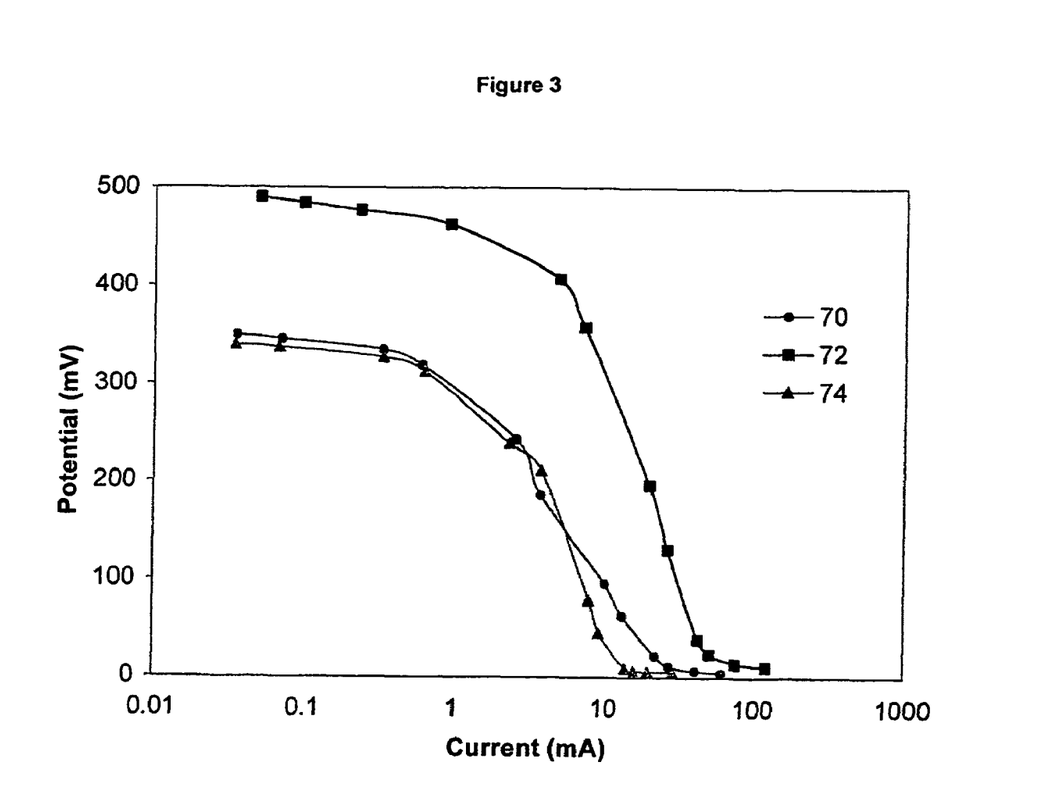
FIG. 3 is a diagram comprising three plots of the-relationship between current and potential for operation of a laboratory scale version of the cell for the electrochemical oxidation of propane to propylene illustrated in FIG. 2, using different compositions of the catalytic anode at different operating temperatures and pressures.

Operation of cell 10 to oxidize propane to propylene will now be illustrated with reference to FIGS. 1 through 3 by three non-limiting examples. Further examples will illustrate operation of the cell to oxidize each of butane in Example 4, and ethyl benzene in Example 5. The data are in each case for operation of an unoptimized cell 10 design and unoptimized operating parameters. It will be recognized that improved performance of cell 10 may be obtained under different operating conditions using amendments to the design for cell 10 without departing from the spirit of the present invention.

EXAMPLE 1

Laboratory test equipment was constructed including laboratory scale cell 10. Laboratory scale cell 10 had a MEA 16 having an effective surface area of approximately 1 square centimeter for catalytic anode 32. Catalytic anode 32 comprised compressed Teflonized carbon powder loaded with platinum as first metal catalyst 36. Catalytic cathode 34 comprised the same material as catalytic anode 32. The anode chamber stream comprised a mixture of propane (10% by volume) diluted with nitrogen as an inert diluent. Oxygen was fed into cathode chamber 18. Open circuit potentials up to 555 millivolts were obtained when cell 10 was operated at atmospheric pressure and at temperatures in the range 50° C. to 95° C. A series of resistances ranging from 0.1 ohms to 1,000,000 ohms was applied as an external circuit load across electrical leads 64 of cell 10. Referring to FIG. 3, it was found that the current and the potential provided by the cell varied with the load, as illustrated by line 70 for operation of cell 10 at atmospheric pressure and at a temperature of 85° C. For example, for a load of 1.0 ohm the potential was found to be 24 millivolts and the current 24 milliamps. Samples of the anode chamber effluent from first outlet 24 were collected into a gas collection cell for use in an infrared spectrometer. Propylene was detected in the infrared spectrum of the anode chamber effluent in amounts corresponding closely to the amounts expected from the current generated by laboratory scale 10. Conversion of the alkane to alkene was about 4-5%. No propyne was detected. However, higher conversion rates could be obtained by reducing flow rate of the hydrocarbon feedstock. Thus the selectivity to propylene as opposed to propyne by electrochemical oxidation of a mixture containing 10% propane was high. The alkene in the effluent from the process could be separated from the alkane in the effluent by means of the different boiling points of the compounder.

EXAMPLE 2

Pure propane was fed as anode chamber feed to laboratory cell 10 having the same catalytic anode 32 and the same catalytic cathode 34 as were used in Example 1. Oxygen wars the cathode chamber feed. The operating pressure in both of anode chamber 12 and cathode chamber 18 was 44 psia. (about 4 atm) and the temperature of cell 10 was 135° C. The open circuit potential generated was 464 millivolts. When an electrical load was connected across electrical leads 64, it was found that the current and the potential provided by the cell varied with the load, as illustrated by line 72 in FIG. 3. When the external circuit load was 1.0 ohm, the potential generated was 42 millivolts and the current generated was 42 milliamps. Propylene was detected in the infrared spectrum of the anode chamber effluent in amounts corresponding closely to the amounts expected from the current generated by laboratory scale cell 10; Conversion was about 4-5%. No propyne was detected. Thus, the oxidation of propane to propylene as opposed to propyne was selective.

EXAMPLE 3

Pure propane was fed as anode chamber feed to laboratory cell 10 having a catalytic anode 32 comprising compressed Teflonized carbon powder loaded with palladium as first metal catalyst 36 and the same catalytic cathode 34 as was used in Example 1 and Example 2. Oxygen was the cathode chamber feed. The operating pressure in both of anode chamber 12 and cathode chamber 18 was 44 psia and the temperature of cell 10 was 135° C. The open circuit potential generated was 353 millivolts. When an electrical load was connected across electrical leads 64, it was found that the current and the potential provided by the cell varied with the load, as illustrated by line 74 in FIG. 3. When the external circuit load was 1.0 ohm, the potential generated was 12 millivolts and the current generated was 12 milliamps. Propylene was detected in the infrared spectrum of the anode chamber effluent in amounts corresponding closely to the amounts expected from the current generated by laboratory scale cell 10. Conversion was about 4-5%. No propyne was detected. Thus, the oxidation of propane to propylene as opposed to propyne was selective.

EXAMPLE 4

Figure 4:
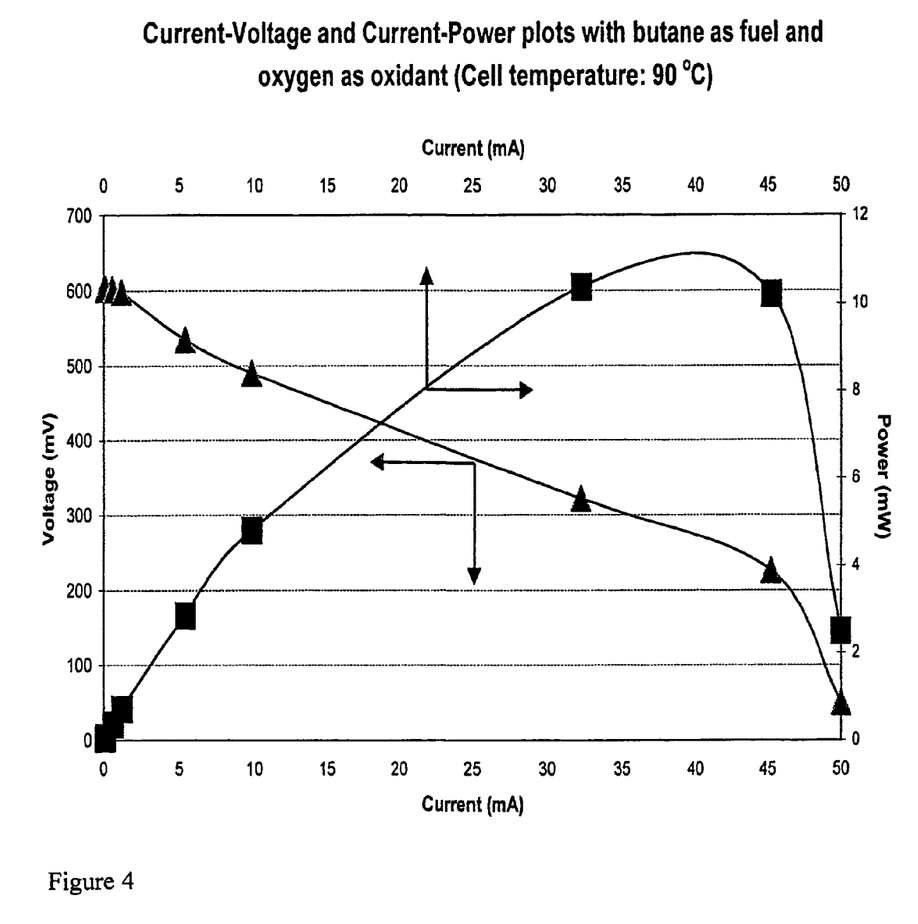
FIG. 4 is a diagram showing the relationship between current and potential for operation of a laboratory scale version of the cell illustrated in FIG. 1 for the electrochemical oxidation of butane to butene at atmospheric pressure and 90° C.
Figure 5:
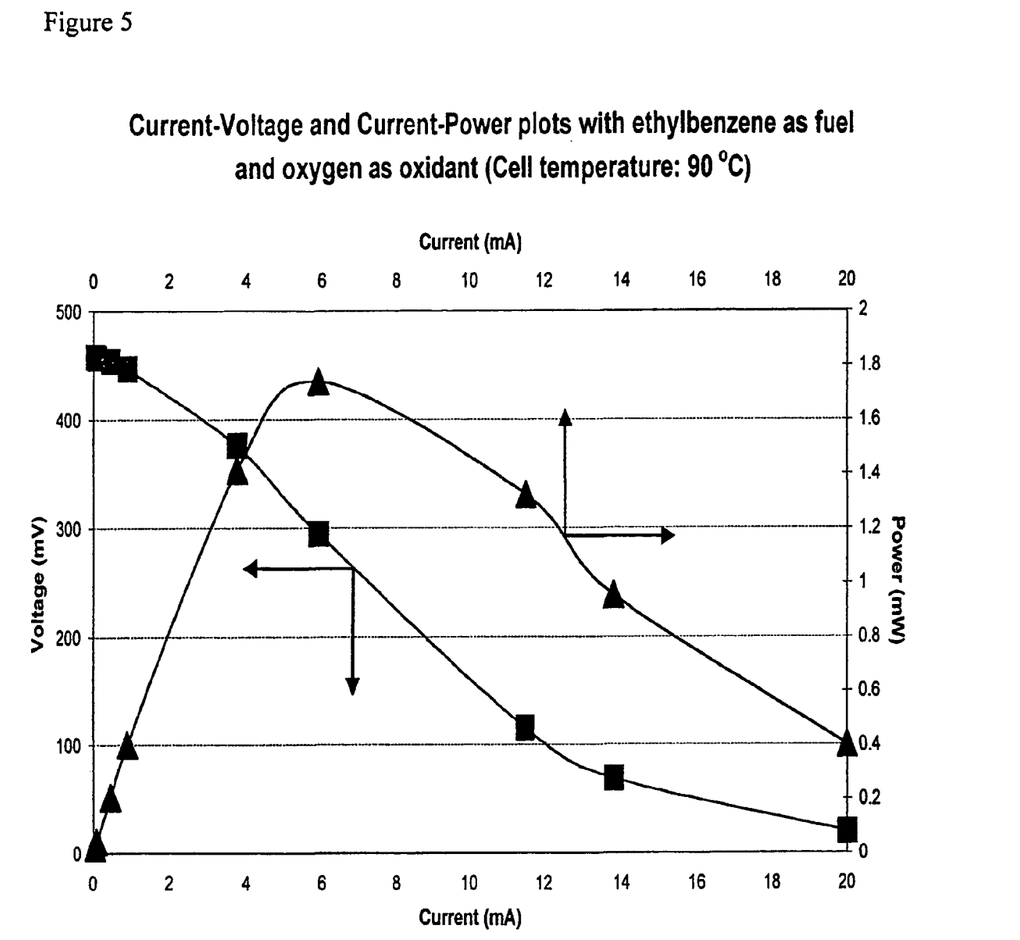
FIG. 5 is a diagram showing the relationship between current and potential for operation of a laboratory scale version of the cell illustrated in FIG. 1 for the electrochemical oxidation of ethyl benzene to styrene at atmospheric pressure and 90° C.

Pure butane was fed as anode chamber feed to laboratory cell 10 having a catalytic anode 32 comprising compressed Teflonized carbon powder loaded with 4.2% platinum and supported on carbon cloth as first metal catalyst 36. The catalytic cathode was a similar catalytic cathode 34 to that used in Examples 1 through 3. The electrodes had a catalyst layer that was 0.5-1 mm thick. Oxygen was the cathode chamber feed. The operating pressure in both of anode chamber 12 and cathode chamber 18 was atmospheric pressure and the temperature of cell 10 was 88° C. The open circuit potential generated was 655 millivolts after operating for 2 hours, which decreased to 644 millivolts after a further 2 hours. When an electrical load was connected across electrical leads 64, it was found that the current and the potential provided by the cell varied with the load. When the external circuit load was 1.0 ohm, the potential generated was 305 millivolts and the current generate was 305 milliamps after operating for 2 hours. FIG. 4 is a diagram showing the relationship between current and potential for operation of a laboratory scale version of the cell illustrated in FIG. 1 for the electrochemical oxidation of butane to butene at atmospheric pressure and 90° C. wherein the catalyst layer was at least 2 mm thick.

When the active catalyst of the catalytic anode was 2.4% platinum and laboratory cell 10 was operated at 88° C., the initial open circuit potential was 494 millivolts, which decreased to 429 milllivolts after operating for 2 hours.

When the active catalyst of the catalytic anode was 9.1% palladium, the open circuit potential was 368 millivolts at an operating temperature of 90° C. Laboratory cell 10 was shut down after 3 hours, and then restarted after a further 19 hours. The open circuit potential then was 255 millivolts at an operating temperature of 82° C. and 392 millivolts at 102° C.

When a thick layer (i.e. over 1 mm) of catalyst was used, the performance was reduced, as illustrated in FIG. 4, and the maximum power density was 11 milliwatts per square centimeter. No butyne was observed.

EXAMPLE 5

Nitrogen gas was passed through liquid ethyl benzene at 90° C. to form a feed gas stream. The gas stream comprising ethyl benzene in nitrogen as an inert carrier gas was fed at 15 milliliters per minute as anode chamber feed to laboratory cell 10 having a catalytic anode 32 comprising compressed Teflonized carbon powder loaded with palladium as first metal catalyst 36 and the same catalytic cathode 34 as was used in Examples 1 through 3. The electrodes had a catalyst layer that was 0.5-1 mm thick. Oxygen was the cathode chamber feed. The operating pressure in both of anode chamber 12 and cathode chamber 18 was atmospheric pressure and the temperature of cell 10 was 90° C. The open circuit potential generated was 460 millivolts. When an electrical load-was connected across electrical leads 64, it was found that the current and the potential provided by the cell varied with the load, as illustrated for one experiment in FIG. 5 wherein the catalyst layer was over 2 mm thick. When the external circuit load was 1.0 ohm, the potential generated was 25 millivolts and the current generated was 25 milliamps. No ethynyl benzene was observed.

The invention claimed is:

1. An electrochemical process for the selective oxidation of an alkane to a corresponding alkene using an electrochemical cell having an anode chamber having an anode and a cathode chamber having a cathode, the anode chamber and the cathode chamber separated at least in part by a proton conducting medium, said process comprising:
   a) providing at least one alkane to the anode chamber;
   b) providing an oxygen containing gas to the cathode chamber;
   c) electrochemically treating the at least one alkane to form the corresponding alkene, protons and electrons;
   d) passing the protons and the electrons to the cathode chamber and combining oxygen in the oxygen containing gas, the electrons and the protons in the cathode chamber to form water; and
   e) withdrawing the corresponding alkene from the anode chamber.

2. The electrochemical process as claimed in claim 1 further comprising maintaining the electrochemical cell at a temperature and a pressure that maintains the moisture of said medium.

3. The electrochemical process as defined in claim 2 in which the pressure is maintained sufficiently high so as to maintain the moistness of the proton-conducting medium.

4. The electrochemical process as defined in claim 2 wherein the pressure is about atmospheric pressure.

5. The electrochemical process as claimed in claim 1 further comprising providing the alkane in a gaseuous state.

6. The electrochemical process as claimed in claim 1 wherein the alkane is selected from the group consisting of propane, a mixture of propane and at least one inert gas, a mixture of propane and at least one inert liquid, and a mixture of hydrocarbons containing propane, and the process further comprises producing propylene as the corresponding alkene.

7. The electrochemical process as defined in claim 6 in which the process is operated at a pressure of at least atmospheric pressure and below a pressure at which one or more of propane and propylene will condense to form a liquid phase the pressure being sufficiently high so as to maintain the moistness of the proton conducting medium at an operating temperature of the process.

8. The electrochemical process as claimed in claim 1 wherein the alkane is selected from the group consisting of butane, a mixture of butane and at least one inert gas, a mixture of butane and at least one inert liquid, and a mixture of hydrocarbons containing butane, and the process comprises producing at least one of 1-butene and 2-butene as the corresponding alkene.

9. The electrochemical process as defined in claim 8 in which the process is operated at an operating temperature and a pressure of at least atmospheric pressure and below a pressure at which butane, and at least one of 1-butene and 2-butene will condense to form a liquid phase, the pressure being sufficiently high so as to maintain the moistness of the proton conducting medium at the operating temperature.

10. The electrochemical process as claimed in claim 1 wherein the alkane is an aromatic alkane selected from the group consisting of ethyl benzene, a mixture of ethyl benzene and at least one inert gas, a mixture of ethyl benzene and at least one inert liquid, and a mixture of hydrocarbons containing ethyl benzene, and the process comprises producing styrene.

11. The electrochemical process as defined in claim 10 in which the process is operated at an operating temperature and a pressure of at least atmospheric pressure and below a pressure at which one or more of ethyl benzene and styrene will condense to form a liquid phase, the pressure being sufficiently high so as to maintain the moistness of the proton conducting medium at the operating temperature.

12. The electrochemical process as claimed in claim 1 wherein the oxygen containing gas is selected from a group consisting of oxygen gas, a mixture of oxygen gas and at least one inert gas, and air and the process further comprises combining protons which have passed through the medium and oxygen in the oxygen containing gas to produce the water.

13. The electrochemical process as claimed in claim 1 wherein the process is operated at a temperature of at least about 50° C.

14. The electrochemical process as claimed in claim 1 wherein the process is operated at a temperature in the range of about 50° C. to about 155° C.

15. The electrochemical process as claimed in claim 1 wherein the process is operated at a temperature in the range of about 50° C. to about 100° C.

16. The electrochemical process as defined in claim 1 in which the process is operated at a pressure of at least atmospheric pressure and below a pressure at which one or more of the alkanes and the alkene will condense to form a liquid phase.

17. The electrochemical process as defined in claim 1 in which the process is operated at a pressure in the range of about 0.5 atm to about 10 atm.

* * * * *